United States Patent
Wenk et al.

(10) Patent No.: US 9,212,936 B2
(45) Date of Patent: Dec. 15, 2015

(54) SENSOR ASSEMBLY

(75) Inventors: Alexander Wenk, Burgoberbach (DE); Matthias Keuten, Nuremberg (DE); Uwe Trenner, Nuremberg (DE); Helmut Karrer, Fuerth (DE); Juergen Henniger, Erlangen-Dechsendorf (DE); Matthias Wieczorek, Neunkirchen am Sand (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 115 days.

(21) Appl. No.: 13/980,192

(22) PCT Filed: Jan. 18, 2012

(86) PCT No.: PCT/DE2012/000040
§ 371 (c)(1),
(2), (4) Date: Aug. 9, 2013

(87) PCT Pub. No.: WO2012/097800
PCT Pub. Date: Jul. 26, 2012

(65) Prior Publication Data
US 2013/0312514 A1    Nov. 28, 2013

(30) Foreign Application Priority Data
Jan. 22, 2011   (DE) .......................... 10 2011 009 156

(51) Int. Cl.
*G01P 1/02* (2006.01)
*G01L 19/14* (2006.01)
*G01D 11/24* (2006.01)

(52) U.S. Cl.
CPC ................... *G01D 11/245* (2013.01)

(58) Field of Classification Search
USPC .......................................................... 73/431
See application file for complete search history.

(56) References Cited

U.S. PATENT DOCUMENTS

| 4,326,143 | A | | 4/1982 | Guth et al. |
| 4,595,897 | A | | 6/1986 | Amano et al. |
| 4,700,973 | A | * | 10/1987 | Gademann et al. ........... 280/735 |
| 4,771,637 | A | | 9/1988 | Kubler |

(Continued)

FOREIGN PATENT DOCUMENTS

| AT | 383 425 | 7/1987 |
| DE | 32 05 067 | 8/1983 |

(Continued)

OTHER PUBLICATIONS

International Search Report of the International Searching Authority for International Application PCT/DE2012/000040, mailed Jul. 18, 2012, 3 pages, European Patent Office, HV Rijswijk, Netherlands.

(Continued)

*Primary Examiner* — Lisa Caputo
*Assistant Examiner* — Jamel Williams
(74) *Attorney, Agent, or Firm* — W. F. Fasse

(57) ABSTRACT

A sensor assembly includes a metal carrier plate (2) and a sensor housing (3) made of plastic, that contains at least one sensor element. The sensor housing (3) is connected to the carrier plate (2) by at least one screw (5) that extends through a through hole (6) of the carrier plate and is screwed into a screwing channel (7) defined in the plastic housing material of the sensor housing. As a result, the sensor assembly has a secure screwed connection.

17 Claims, 3 Drawing Sheets

(56) References Cited

U.S. PATENT DOCUMENTS

| | | | |
|---|---|---|---|
| 4,978,883 A | 12/1990 | Komurasaki | |
| 5,939,616 A | 8/1999 | Ito et al. | |
| 6,296,236 B1* | 10/2001 | Ott | 267/140.11 |
| 6,850,412 B2 | 2/2005 | Peter | |
| 2001/0011478 A1* | 8/2001 | Albert et al. | 73/431 |
| 2002/0149916 A1* | 10/2002 | Kurle et al. | 361/752 |
| 2003/0174472 A1* | 9/2003 | Skofljanec et al. | 361/736 |
| 2008/0072670 A1* | 3/2008 | Brandmeier et al. | 73/493 |
| 2010/0198465 A1* | 8/2010 | Buyukbas et al. | 701/49 |
| 2012/0292469 A1* | 11/2012 | Miekley et al. | 248/221.11 |

FOREIGN PATENT DOCUMENTS

| | | |
|---|---|---|
| DE | 39 34 005 | 4/1990 |
| DE | 41 13 784 | 10/1991 |
| DE | 195 20 010 | 9/1996 |
| DE | 697 10 683 | 8/2002 |
| DE | 102004041591 | 3/2006 |
| DE | 102004034290 | 1/2007 |
| DE | 102007001855 | 7/2008 |
| DE | 102007042594 | 3/2009 |
| DE | 102009043177 | 4/2011 |
| EP | 0 540 071 | 5/1993 |
| EP | 0 595 022 | 5/1994 |
| EP | 1 211 140 | 6/2002 |

OTHER PUBLICATIONS

PCT International Preliminary Report on Patentability including English Translation of PCT Written Opinion of the International Searching Authority for International Application PCT/DE2012/000040, issued Jul. 23, 2013, 7 pages, International Bureau of WIPO, Geneva, Switzerland.

German Search Report for German Application No. 10 2011 009 156.4, dated Feb. 24, 2012, 4 pages, Muenchen, Germany, with English translation, 4 pages.

* cited by examiner

SENSOR ASSEMBLY

FIELD OF THE INVENTION

The invention relates to a sensor assembly including a carrier plate and a sensor housing that contains at least one sensor element.

BACKGROUND INFORMATION

In a known sensor assembly, the sensor housing is screwed to the carrier plate via a separate threaded insert connected to the sensor housing. The separate threaded insert disadvantageously requires an additional production step for connecting it to the sensor housing, it requires additional space, and it may fail to provide a secure screwed connection when subjected to temperature variations or vibrations.

SUMMARY OF THE INVENTION

It is an object of the present invention to improve a sensor assembly of the kind mentioned in the opening paragraph in such a manner that the screwed connection is secure.

According to the invention, this object can be achieved by a sensor assembly having the features set forth herein. A sensor assembly according to an embodiment of the present invention may comprise a metal carrier plate, a plastic housing, and a sensor element in the housing. A screw passes through a hole in the carrier plate and is screwed into a screwing channel formed in the plastic material of the housing, to connect the housing to the carrier plate.

According to an embodiment of the invention, it has been found that a screwing channel that is defined directly in the plastic housing material of the sensor housing avoids problems which are caused in the known state of the art in which the screwing channel is provided in a separate threaded insert that is connected to the sensor housing. If the screwing channel is defined directly in the housing material, as proposed by an embodiment of the present invention, it is also possible to make use of an elasticity and/or plasticity of the housing material in order to secure the screwed connection. During production of the sensor housing, one production step relating to the connection of the threaded insert with the sensor housing, e.g. placing a threaded insert in an injection molding tool used to produce the sensor housing, is no longer necessary. The screwed connection can be designed to securely connect the sensor housing to the carrier plate even in case of temperature variations or in an environment subjected to vibrations. In other words, the screwed connection can be made resistant to temperature changes and/or vibrations. In addition, less installation space is required in the area of the screwed connection due to the fact that there is no separate threaded insert.

The screwed connection is made even more secure if the screw and/or the sensor housing is/are designed to undergo elastic deformation or plastic deformation under the action of the screwing force exerted along a screwing axis while screwing-in the screw.

If a cavity is provided in the housing between the carrier plate and the screwing channel, it is possible to define a degree of pre-tensioning of the screwed connection, which makes the screwed connection secure. Deformation portions of the housing, such as ribs, that undergo elastic deformation due to the screwing force, have proved to be particularly suitable for achieving a pre-tensioning that secures the screwed connection. Said deformation portions can be provided in the form of appropriate weak portions of the housing structure. Such weak portions can also be provided in the form of recesses in the sensor housing, in particular recesses made in the edge thereof.

A carrier plate that is able to undergo elastic deformation due to the screwing force, provides the same advantages.

BRIEF DESCRIPTION OF THE DRAWINGS

Below, exemplary embodiments of the invention will be explained in more detail with reference to the drawings, in which.

DETAILED DESCRIPTION OF EXAMPLE EMBODIMENTS OF THE INVENTION

Figure 1:
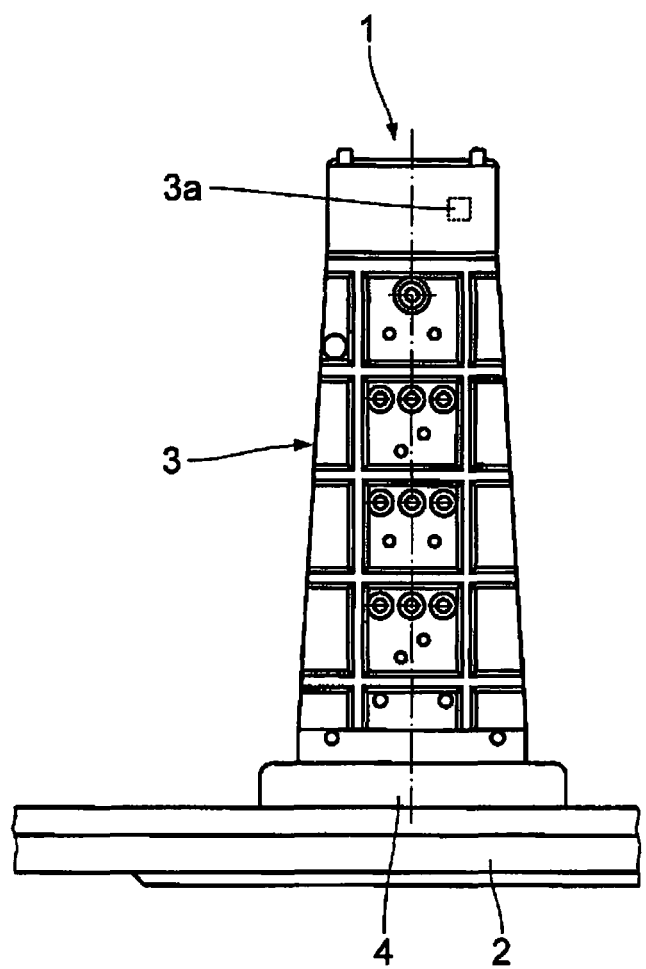
FIG. 1 shows a side view of a sensor assembly including a metal carrier plate and a sensor housing made of plastic.

FIG. 1 shows a sensor assembly 1 including a metal carrier plate 2, which is shown cut-off, and a sensor housing 3 made of plastic which contains a sensor element 3a, which is shown schematically. The sensor housing 3 is also referred to as plastic dome. The sensor assembly 1 can be installed in a gearbox or an engine compartment of a motor vehicle. The sensor element 3a of the sensor assembly 1 can be used to determine the rotational speed, distance or other measured parameters, for example in control devices.

Figure 2:
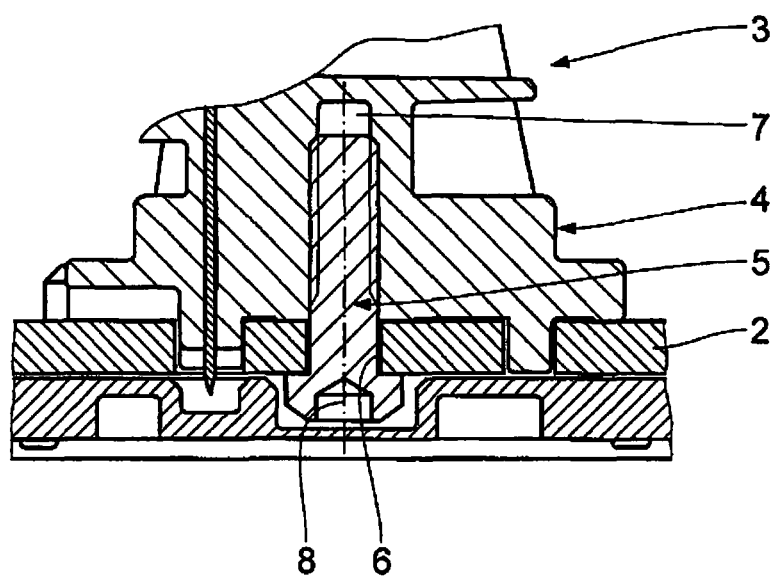
FIG. 2 shows a vertical longitudinal section of a bottom part of the sensor assembly at the height of a screwed connection of the sensor housing and the carrier plate.

FIG. 2 shows details of a bottom part 4 of the sensor housing 3. The sensor housing 3 is connected to the carrier plate 2 by means of at least one screw 5. Said screw is passed through a through hole 6 of the carrier plate 2. A screwing channel 7 in the sensor housing 3 is defined by the plastic housing material. The screw 5 has a self-tapping thread. This means the screw 5 is a self-tapping screw. The screw 5 is designed in such a manner that it will undergo elastic deformation under the action of a screwing force acting along a screwing axis 8. It is also possible that the screw 5 undergoes plastic deformation under the action of the forces exerted while screwing, in particular while the thread cuts into the housing material of the sensor housing 3. As a result, an interlocking effect between the external thread of the screw 5 and the housing material can be increased.

Figure 3:
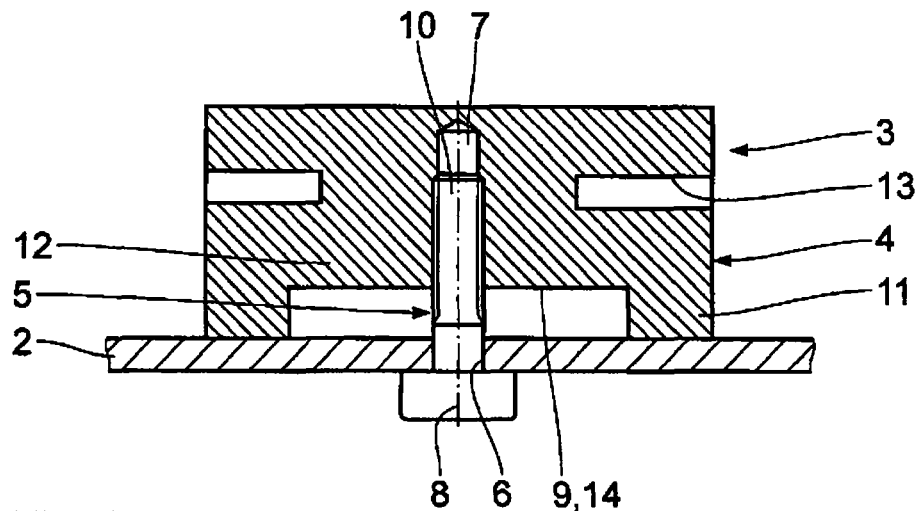
FIG. 3 is a schematic view of another design of a bottom part of the sensor assembly and another embodiment of a screwed connection, again as an axial longitudinal section and with a slightly tightened screw.
Figure 4:
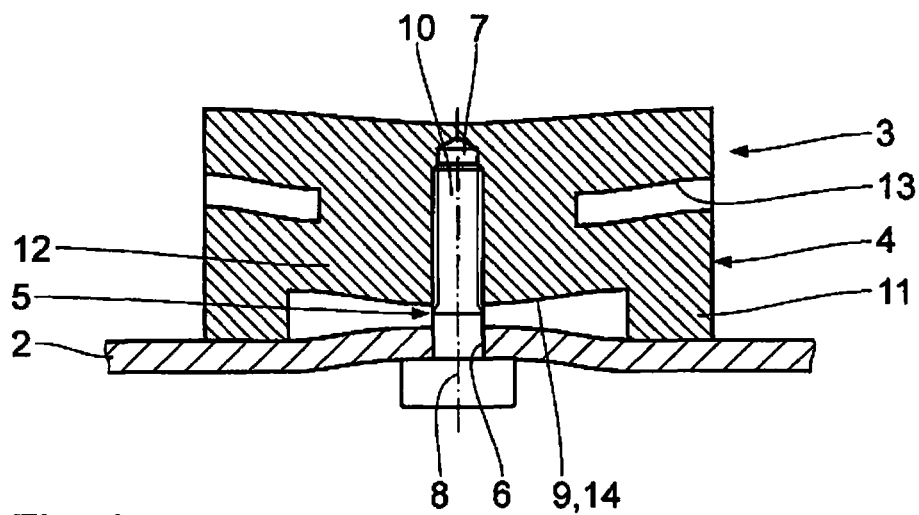
FIG. 4 shows the screwed connection according to FIG. 3 with a more tightened screw.

FIGS. 3 and 4 show another embodiment of a screwed connection between a bottom part 4 of a sensor housing 3 and a carrier plate 2. Components equivalent to those explained with reference to FIGS. 1 and 2 above have the same reference numerals and will not be discussed in detail again. A cavity 9 is arranged between the through hole 6 and the screwing channel 7. Said cavity surrounds a screwing body 10 of the screw 5, so that the sensor housing 3 is supported on the carrier plate 2 by means of an annular portion 11 while being spaced from the screwing channel 7.

Deformation portions of the sensor housing 3, which delimit the cavity 9, are designed in such a manner that they will undergo elastic deformation under the action of a screwing force acting along the screwing axis 8. In the sensor housing 3 shown in FIGS. 3 and 4, these deformation portions are provided in the form of appropriate weak portions of the housing structure, specifically by means of an annular rib 12 shaped integrally with and extending from the annular portion 11. Opposite the cavity 9, the annular rib 12 is delimited by a recess in the form of a circumferential groove 13 in the bottom part 4 of the sensor housing 3. The deformation portions can have a different design in the form of springs and/or ribs and/or recesses, provided they ensure elastic deformation of the sensor housing 3 under the action of the screwing force. Said deformation portions can be provided in the form of appropriate weak portions of the housing structure.

FIG. 4 shows the screwed connection of FIG. 3, however with the screw 5 well tightened. The deformation portions of the sensor housing, i.e. the annular rib 12, the circumferential groove 13 and the adjoining housing portions of the sensor housing 3, have undergone elastic deformation under the action of the screwing force. As a result, a cavity wall 14 facing the carrier plate 2 has moved towards the carrier plate 2 in an annular region adjacent to the screwing channel 7.

In the embodiment shown in FIGS. 3 and 4, the carrier plate 2 is also designed in such a manner that it will undergo elastic deformation under the action of the screwing force, as can be seen from a comparison of FIGS. 3 and 4.

When the screw 5 is tightened, the carrier plate 2 has moved towards the cavity wall 14 in an annular region adjacent to the screwing body 10. However, even when the screw 5 is tightened, the cavity wall 14 and the carrier plate 2 do not make contact with each other, i.e. there will still be a distance between them.

The invention claimed is:

1. A sensor assembly
   including a metal carrier plate,
   including a sensor housing that is made of a plastic housing material and that contains at least one sensor element,
   wherein the sensor housing is connected to the carrier plate by at least one screw that extends through a through hole of the carrier plate, and
   wherein a screwing channel to receive the screw engaged therein is defined in the plastic housing material.

2. The sensor assembly according to claim 1, characterized in that the screw and/or the sensor housing is/are adapted to undergo elastic deformation due to a screwing force exerted by the at least one screw acting along a screwing axis of the respective screw.

3. The sensor assembly according to claim 2, characterized in that a cavity is arranged between the through hole and the screwing channel such that the sensor housing is supported on the carrier plate at a distance from the screwing channel.

4. The sensor assembly according to claim 3, characterized in that the sensor housing includes deformation portions which delimit the cavity, and the deformation portions are adapted to undergo elastic deformation due to the screwing force.

5. The sensor assembly according to claim 4, characterized in that the deformation portions are springs or ribs.

6. The sensor assembly according to claim 1, characterized in that the carrier plate is adapted to undergo elastic deformation due to a screwing force exerted by the at least one screw acting along a screwing axis of the screw.

7. The sensor assembly according to claim 1, characterized in that a cavity is arranged between the through hole and the screwing channel such that the sensor housing is supported on the carrier plate at a distance from the screwing channel.

8. The sensor assembly according to claim 1, wherein the screwing channel is a blind closed-ended hole in the plastic housing material.

9. The sensor assembly according to claim 1, wherein the screw has a thread that engages into the plastic housing material bounding the screwing channel so as to secure the screw and therewith the carrier plate to the sensor housing.

10. The sensor assembly according to claim 1, wherein the screw has a self-tapping thread configured and adapted to cut and self-tap into the plastic housing material bounding the screwing channel.

11. The sensor assembly according to claim 1, excluding a separate threaded insert connected to the sensor housing for receiving the screw.

12. A sensor assembly comprising:
    a carrier plate made of metal and having a through hole penetrating therethrough;
    a housing made of a plastic material and having a screw-receiving channel formed in said plastic material;
    a sensor in said housing; and
    a screw that has a screw shaft and a screw thread on said screw shaft, wherein said screw shaft extends through said through hole of said carrier plate and into said screw-receiving channel, and said screw thread engages into said plastic material bounding said screw-receiving channel to secure said screw and therewith said carrier plate to said housing.

13. The sensor assembly according to claim 12, wherein said screw is configured and adapted to undergo an elastic deformation and does undergo said elastic deformation due to a screwing force exerted by said screw between said carrier plate and said housing in a direction along an axis of said screw.

14. The sensor assembly according to claim 12, wherein said housing is configured and adapted to undergo an elastic deformation and does undergo said elastic deformation due to a screwing force exerted by said screw between said carrier plate and said housing in a direction along an axis of said screw.

15. The sensor assembly according to claim 12, wherein said carrier plate is configured and adapted to undergo an elastic deformation and does undergo said elastic deformation due to a screwing force exerted by said screw between said carrier plate and said housing in a direction along an axis of said screw.

16. The sensor assembly according to claim 12, wherein said screw thread is a self-tapping thread, said screw is a self-tapping screw, said screw thread engages into said plastic material by self-tapping a female thread into said screw-receiving channel, said screw-receiving channel has said female thread self-tapped therein only where said screw thread is engaged into said screw-receiving channel, and a portion of said screw-receiving channel extending beyond an end of said screw does not have a thread therein.

17. The sensor assembly according to claim 12, wherein said screw-receiving channel is a blind closed-ended hole in said plastic material.

\* \* \* \* \*